F. C. NICHOLAS.
FURNACE.
APPLICATION FILED AUG. 30, 1917.
1,350,233.
Patented Aug. 17, 1920.
2 SHEETS—SHEET 2.
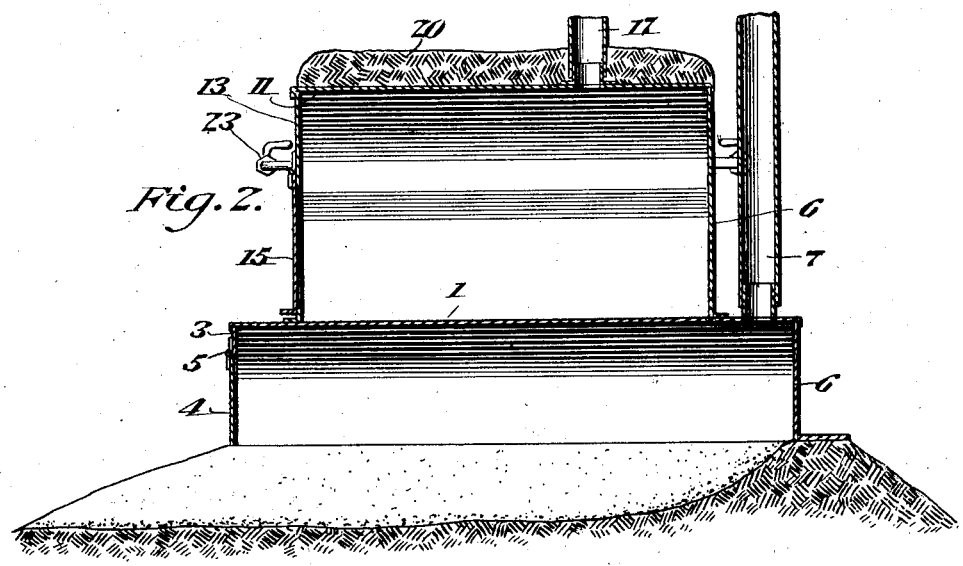
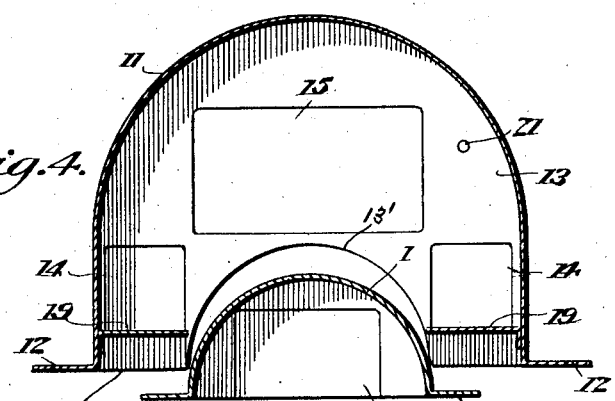
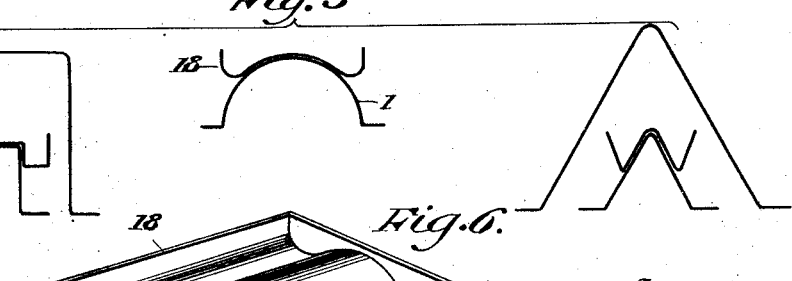
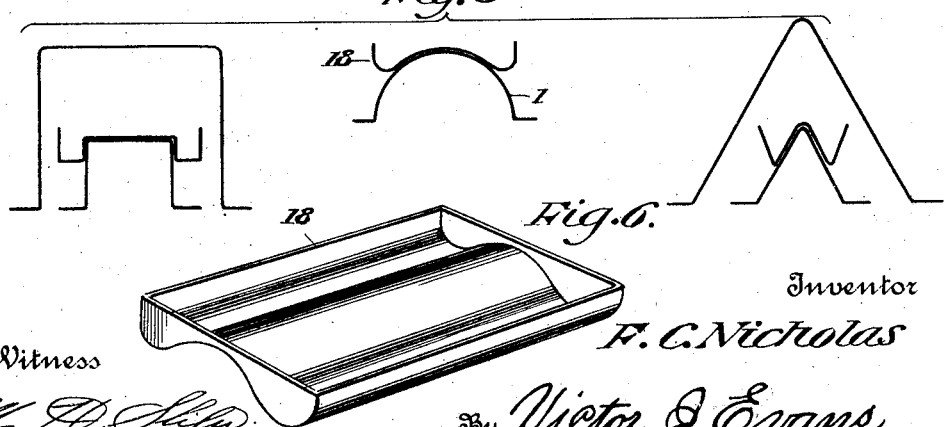
Witness
Inventor
F. C. Nicholas
By Victor J. Evans
Attorney

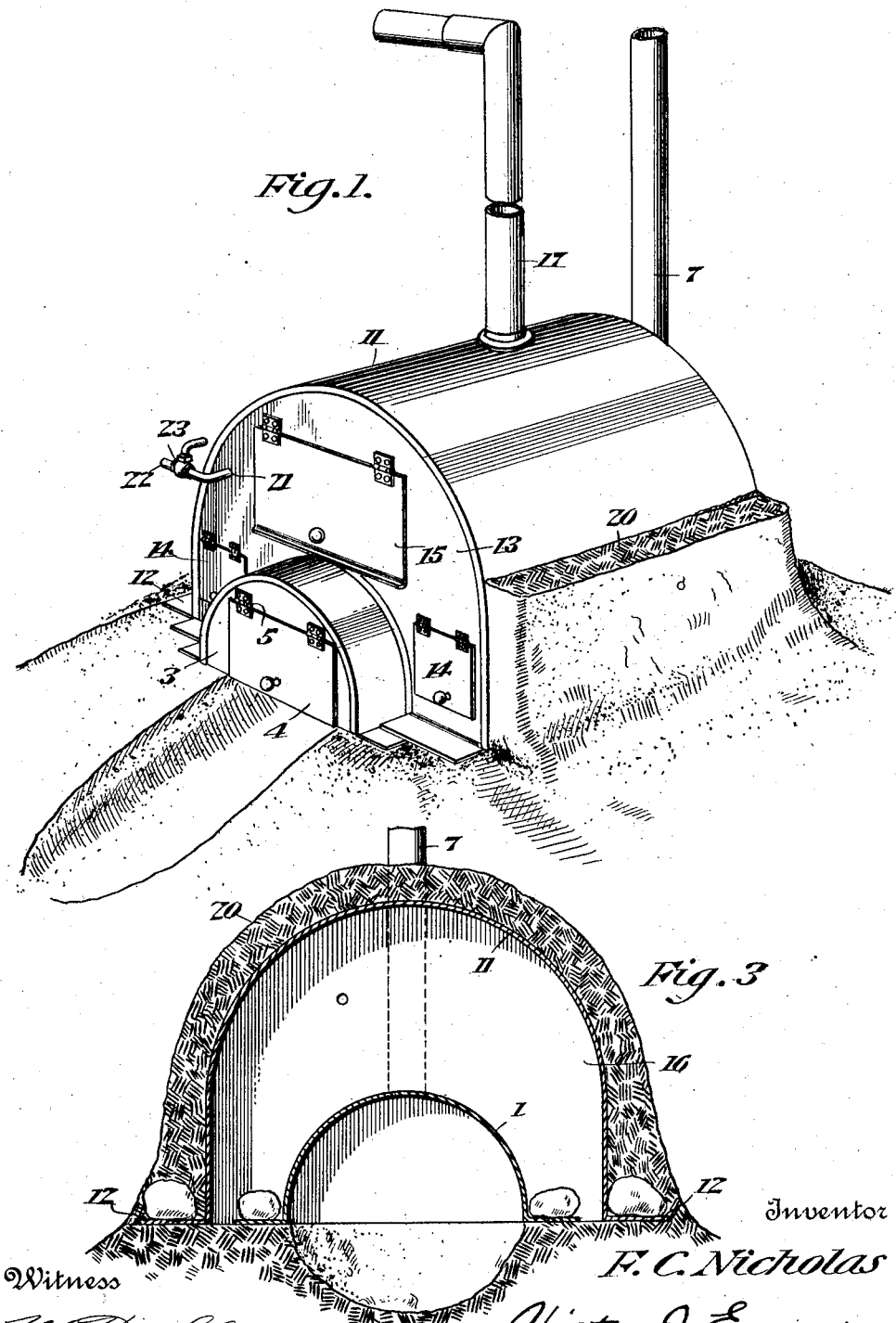

UNITED STATES PATENT OFFICE.

FRANCIS C. NICHOLAS, OF BOSTON, MASSACHUSETTS.

FURNACE.

1,350,233.   Specification of Letters Patent.   Patented Aug. 17, 1920.

Application filed August 30, 1917. Serial No. 188,881.

*To all whom it may concern:*

Be it known that I, FRANCIS C. NICHOLAS, a citizen of the United States, residing at Boston, in the county of Suffolk and State of Massachusetts, have invented *new and useful Improvements in Furnaces, of which the following is a specification.

This invention relates to stoves and furnaces, and more especially to those which heat air; and the object of the same is to produce a portable furnace structure for use in the field or elsewhere as desired, intended also to permit the introduction into the air chamber of chemicals in solid, liquid or gaseous form for admixture with the air being heated. Incidentally, it is possible to cook food within the air chamber of this furnace if desired, and other possibilities and elaborations will be set forth in the following specification. The same includes a specific description of the preferred manner of carrying out my invention, reference being made to the accompanying drawings wherein:—

Figure 1 is a perspective view of this furnace complete, showing the same as set up upon the ground and covered partially by luting, which may be accomplished with earth or other material readily available on the march or in the field.

Fig. 2 is a longitudinal section through the parts of this furnace assembled, and Fig. 3 is a cross-section thereof.

Fig. 4 is a detailed view showing the two parts slightly separated and illustrating shelves which may be provided within the outer casing for a purpose yet to appear.

Fig. 5 is a detail in diagram showing several forms which may be given the shell of the inner chamber and will be correspondingly given to a pan or receptacle for chemicals, etc., which is to be introduced into the outer chamber and rested or supported upon the apex or top of the inner chamber.

Fig. 6 is a perspective view of the preferred form of pan.

In the course of long and varied experience I have discovered the need for an economical and portable apparatus with which various kinds of food may be treated and possibly cooked or cured, and with which sterilized air, hot or cold, dry or moist, and possibly impregnated with appropriate chemicals, can be readily secured for use as may be desired. In order to meet this demand, after various experiments I have produced a furnace whose exact details of construction are unimportant excepting as hereinafter claimed, and whose proportions and materials may be left to the manufacturer. But the preferred and successful type of my furnace is made of sheet metal which I find to be light and strong, preferably galvanized to protect it against the elements, and generally of a size permitting it to be carried readily in the wagon train of an army, on shipboard or on a railway train, or perhaps even on the back of a pack animal. I economize in weight and bulk by resting this furnace squarely on the ground and omitting all grates, piling the fuel directly on the earth's surface, and perhaps scooping out the surface a little to make a channel to contain the burning fuel or the embers. It is essential that the device be portable, not only for transportation easily as above suggested, but because it is my intention to carry the furnace to the food to be treated, rather than bringing the food to the furnace, and of course wherever it is set up the ground is available for it and fuel is at hand because it will be seen that I am not limited at all in that particular.

Coming now more particularly to a preferred construction of my invention and referring to the drawings herewith, the numeral 1 designates the inner shell which forms the casing of the combustion chamber, and as seen in Figs. 1, 2 and 3, this shell is curved or arched through about one-half a circle, its longitudinal edges having outstanding flanges formed to rest upon the ground whether the latter is flat or is built up a little as it preferably will be, as seen in Fig. 1. The front end 3 is closed by a wall made preferably flat and upright as shown, and at the base of this wall is a door 4 which may well be hinged across its upper edge as indicated at 5. It is through this door that fuel is admitted and the ashes are withdrawn from time to time. The rear end of the casing is closed also by a flat wall 6, preferably upright, and a flue 7 opens through the rear end of the casing.

The second element of this structure is by preference made also of sheet metal for the reasons above given, and when it is placed accurately over the first element, it defines a space between the two elements which I will call the hot air chamber. Said second element comprises an outer shell 11 which, if the inner shell 1 is curved as suggested above, would also be curved, although the outer shell will by preference extend through slightly more than a semi-circle so that it is somewhat taller than the inner shell, and a little wider. At its side edges it also has outstanding flanges 12 constituting feet upon which it is supported when these feet rest squarely on the ground, whether the latter is level or built up as suggested above. Thus this element, as well as the element above described, rests entirely on its own foundation. The front end of said second element is practically crescent-shaped, and is a solid sheet 13 of metal excepting openings covered by hinged doors 14 and 15; and the rear end 16 is also a solid unbroken upright sheet of substantially the same shape as the front end. That is to say, the outer and upper edges of these walls are united with the ends of the shell 11, whereas the inner and lower curved edges of these walls are struck on such an arc that they will fit closely over the inner shell 1 when the parts are assembled as seen in Fig. 1. By the expression "fits closely" I desire it to be understood as stated, that although these elements are entirely separate and in no manner fastened together when they are in use, at that time the outer element fits so closely upon the inner that there is no leakage. Finally one or more outlet pipes 17 lead from a high point in the outer shell, through which the heated air is to be conveyed to any point where it is to be further used. The outer member is by preference slightly shorter than the inner and first-described member, although this detail is not essential. At this point I may refer to Fig. 5 wherein is diagrammatically illustrated other forms or designs which both shells might take. At the center of this view the shell is shown as arched, at the left the shell is angular, and at the right of the view a shell is shown having a pointed or A-shaped top. In any case one of the doors as 15 in the front end of the outer shell is disposed opposite the top of the inner shell, and through this door I may pass a pan 18 to the hot-air chamber, and rest it on the top or apex of the inner shell. For this purpose the transverse center of the pan is shaped accordingly, as shown also in diagram in Fig. 5. In Fig. 4 I have shown how the outer element may be provided with internal shelves 19, and if so it is obvious that pans or other utensils may be passed through the doors 14 and seated on the shelves for purposes to appear below.

In setting up this device for use, the operator will select a proper point where the ground is level or perhaps where it rises a little, or in fact he may prefer to scrape up the ground so that it may rise a little as indicated in Fig. 1, and he may prefer to dig out a channel for the ashes and embers as suggested above. On this spot he places the inner shell, resting its feet 2 squarely on the ground so that they constitute a base for supporting this element. Next over the latter he places the second element with its feet 12 again resting on the ground and constituting a base therefor. The recesses 13' of the end walls 13 snugly receive the shell 1 and the edges 13'' of the end walls 13 rest upon the flanges 1' provided at the edges of the shell. The entire device is then luted if desired, by plastering over it a coating 20 of moist soil which is readily available. This is applied in the form of mud, and readily becomes dry and caked as soon as a fire is built in the combustion chamber. Its purpose is to conserve the heat and confine it to the air chamber as far as possible, although of course the luting will not cover the doors. If desirable I might provide openings 21, preferably in the front wall of the outer element, pump air into the air chamber, temporarily as by means of a bellows or hand pump, or permanently if any other type of pump were available; and, although not illustrated, the air circulation within this chamber could be increased by applying suction at its remote end and preferably at a high point—the purpose of this detail being to rapidly change the air within this element. I mention this detail now in order to amplify the fact that if these air inlet and outlet openings are provided, they also must not be covered with the luting although doubtless they would have appropriate nipples and valves. A nipple is shown at 22 in Fig. 1, and a valve at 23; I have not thought it necessary to illustrate the air pump or suction device. The door of the combustion chamber may be set open or closed and will therefore itself serve as a damper, although of course it might be possible to provide this door with a damper if preferred. It will be observed that I have avoided as many complications and details as possible, consistent with the provision of an apparatus which may be successfully used for the purposes for which it is intended, and one which is fool-proof and therefore is capable of use by the most ignorant of people with but little instruction. Also I consider it highly important that the device as a whole be portable so that it may be brought into the localities where food is abundant, for curing food and preparing it for shipment, and possibly for cooking the food if desired rather than that the large quantities of food which may be treated with the apparatus be brought to it. In other words, it is more economical to move a portable furnace than it is to transport a large volume of food. It is unnecessary in this specification to go into details as to the manner of treating the food, but broadly I might state that fuel readily available will generate sufficient heat in the combustion chamber to raise the temperature of the air in the hot-air chamber very quickly to a point where it may be used, and soon to a point where it will be sterilized. If it is desired to impregnate this air with the fumes of any chemicals, they will be placed in a pan 18, passed through the door 15, and laid on the apex of the inner element where the pan of course receives the direct heat from the shell of this element as well as the heat of the surrounding air, and by properly regulating the degree of heat the fumes will be given off and commingled with air within the outer shell, and later being passed off through the pipe 17 and applied to the food in a manner not necessary to amplify. The device may also be used for cooking food, by placing it in proper pans or receptacles and passing them through the doors 14 onto the shelves 19. In fact it is quite possible to provide the interior of the outer shell 11 with a number of shelves for this purpose. When the apparatus is used for cooking, circulation of air may be kept up by admitting it through the inlet opening and withdrawing it through the outlet opening if desired, because at this time the air within the outer shell (which latter is in reality then an oven) becomes impregnated with the fumes of the food cooked, and would doubtless then not be used for curing other foods. Water and other liquids may be heated by putting them into proper utensils and placing the latter within the outer shell in the same manner, but of course it is not practicable to heat anything by putting it upon the top of this device if the same is covered with the luting. However, in certain instances and possibly in tropical countries or in warm weather, it is obvious that the luting may be omitted. I use it to conserve the heat within the air chamber, but if the conditions were such that the luting be not needed, I will of course omit it. In fact, this apparatus is possible of use as a heater for a tent, camp, or the like, when the luting is not used. In any event, luting with ordinary mud can be applied at will and removed at will with little labor, and is always available.

What I claim as new is:—

A furnace of the class described comprising an inner shell of semi-circular shape in cross section and provided with bottom flanges at its sides, end members closing the ends of said shell, a door in one of said end members, a chimney connected with the other end, a second shell of inverted U-shape in cross section of less length than the first shell, end members for said second shell, having semi-circular openings therein for engaging the projecting ends of the first shell, a door in one of said end members of the second shell, a chimney connected with the top of the second shell and flanges on the lower edges of the second shell and on the lower edges of the end members thereof, said last mentioned flanges engaging the flanges of the first shell.

In testimony whereof I affix my signature.

FRANCIS C. NICHOLAS.